United States Patent [19] | [11] 4,426,758
Castoe | [45] Jan. 24, 1984

[54] SEAL PULLER

[76] Inventor: John H. Castoe, 10234 McVine St., Sunland, Calif. 91040

[21] Appl. No.: 410,308

[22] Filed: Aug. 23, 1982

[51] Int. Cl.[3] ..................... B23P 19/04
[52] U.S. Cl. ..................... 29/265
[58] Field of Search ..................... 29/261-263, 29/265, 258-260

[56] References Cited

U.S. PATENT DOCUMENTS

| | | | |
|---|---|---|---|
| 2,031,998 | 2/1936 | Bliss | 29/265 |
| 3,052,973 | 9/1962 | Williams | 29/265 |
| 3,055,093 | 9/1962 | Ruble | 29/265 |
| 3,340,593 | 9/1967 | Savastano | 29/262 |
| 3,611,540 | 7/1969 | Gibu | 29/263 |

*Primary Examiner*—Robert C. Watson
*Attorney, Agent, or Firm*—Christie, Parker & Hale

[57] ABSTRACT

A seal puller pulls an annular seal from the interior of a cylindrical housing. The seal puller includes a hollow elongated externally threaded support rod and an elongated externally threaded adjustment rod passing through the hollow interior of the support rod. A tapered jaw spreader is carried on the end of the actuating rod. A support ring is rigidly affixed to the support rod. A plurality of elongated flexible jaws are rigidly affixed to the support ring and extend alongside the tapered jaw spreader. A depth guide sleeve carried on the support ring has an annular end wall spaced from flanged tips of the jaws. The axial position of the sleeve on the support ring is adjustable to pre-set the spacing between the end wall of the sleeve and the tips of the jaws to match the seal thickness. A pressure plate is slidable on the support rod, and a pressure adjustment nut is threaded onto the support rod adjacent the pressure plate. An actuating nut is threaded onto an end portion of the actuating rod which protrudes from the end of the support rod opposite the jaws. The tool is inserted into the seal housing so the jaw spreader and the jaws, in a retracted position, can pass through a central opening in the seal. The end wall of the sleeve acts as a stop to engage a front face of the seal. The actuating nut is then tightened against the support rod to draw the jaw spreader out of the housing. The wider tapering jaw spreader expands the jaws to engage the rear face of the seal. The pressure adjustment nut is then tightened against the pressure plate to apply pressure to the end wall of the housing for drawing the support rod out of the housing. This draws the jaws axially out of the housing which pulls the seal from its seat in the housing.

10 Claims, 5 Drawing Figures

SEAL PULLER

FIELD OF THE INVENTION

This invention relates to a seal puller for extracting a seal from the inside of a cylindrical housing or sleeve. One use of the invention is for extracting oil seals from a power steering rack and pinion housing.

BACKGROUND OF THE INVENTION

A power steering rack and pinion housing has a number of internal oil seals. If oil leakage is present, one or more of these seals may require replacement. It is much less expensive to remove and replace the seals than to replace the entire power steering unit. However, removal and replacement of the seals can be a time-consuming task. A commonly used prior art seal puller is a special tool with jaws that spread apart to lock onto the seal. A slide hammer is then attached to the seal puller and used to impact the seal a number of times to eventually remove it.

The number of tools that a mechanic must have available to replace the seals in power steering units of various makes of automobiles can be prohibitive. For instance, different auto manufacturers require a number of special tools for removing the seals from their power steering rack and pinion housings. In some instances, an auto manufacturer will each year require one or more new special tools for removing the oil seals from the power steering units. A large number of tools is required to remove the seals from all power steering units because the sizes and thicknesses of the oil seals varies from one auto manufacturer to the next. A seal, such as the inner rack seal (also referred to in the art as the internal high pressure rack oil seal) is located internally down inside the rack and pinion housing. The seal puller must extend to just the correct depth in the housing and lock onto the seal before the seal can be extracted with the slide hammer. This problem has been met in the past by use of a separate special tool for tightening onto each seal.

The present invention provides a universal seal puller that can be used to remove the oil seals from the rack and pinion portions of all power steering units.

SUMMARY OF THE INVENTION

Briefly, the seal puller of this invention is used to extract an annular seal from the inside of a cylindrical housing. The tool has flexible jaws and a jaw spreader, both of which can fit through the opening in the seal. A depth guide sleeve on the tool is held in a fixed position spaced from the ends of the jaws. An end of the sleeve is adapted to bear against an annular front face of the seal, and the ends of the jaws are adapted to engage a rear face of the seal. The spacing between the ends of the sleeve and the jaws can be adjusted to adapt to seals of different thicknesses. The jaw spreader is actuated to expand the jaws so the ends of the jaws engage the rear face of the seal. The tool has an exterior bearing plate for engaging a fixed portion of the housing, such as an external annular end wall of the housing. A support rod extends from the sleeve, along the axis of the housing, to the exterior of the housing and through the bearing plate. The jaws and the sleeve are supported on the support rod. The bearing plate is tightened against the end wall of the housing. This draws the support rod outwardly from the housing which causes the jaws and the sleeve to move axially toward the exterior of the housing to pull the seal from the housing.

The jaw spreader can expand the jaws to engage seals of differing diameters. The adjustable spacing between the sleeve and the jaws accommodates seals of different thicknesses. Thus, all seals of various shapes and sizes can be easily accommodated. A separate slide hammer also is avoided; and as a result, an oil seal can be removed in about half the time required when using a prior art seal puller and a separate slide hammer.

These and other aspects of the invention will be more fully understood by referring to the following detailed description and the accompanying drawings.

DRAWINGS

DETAILED DESCRIPTION

Figure 1:
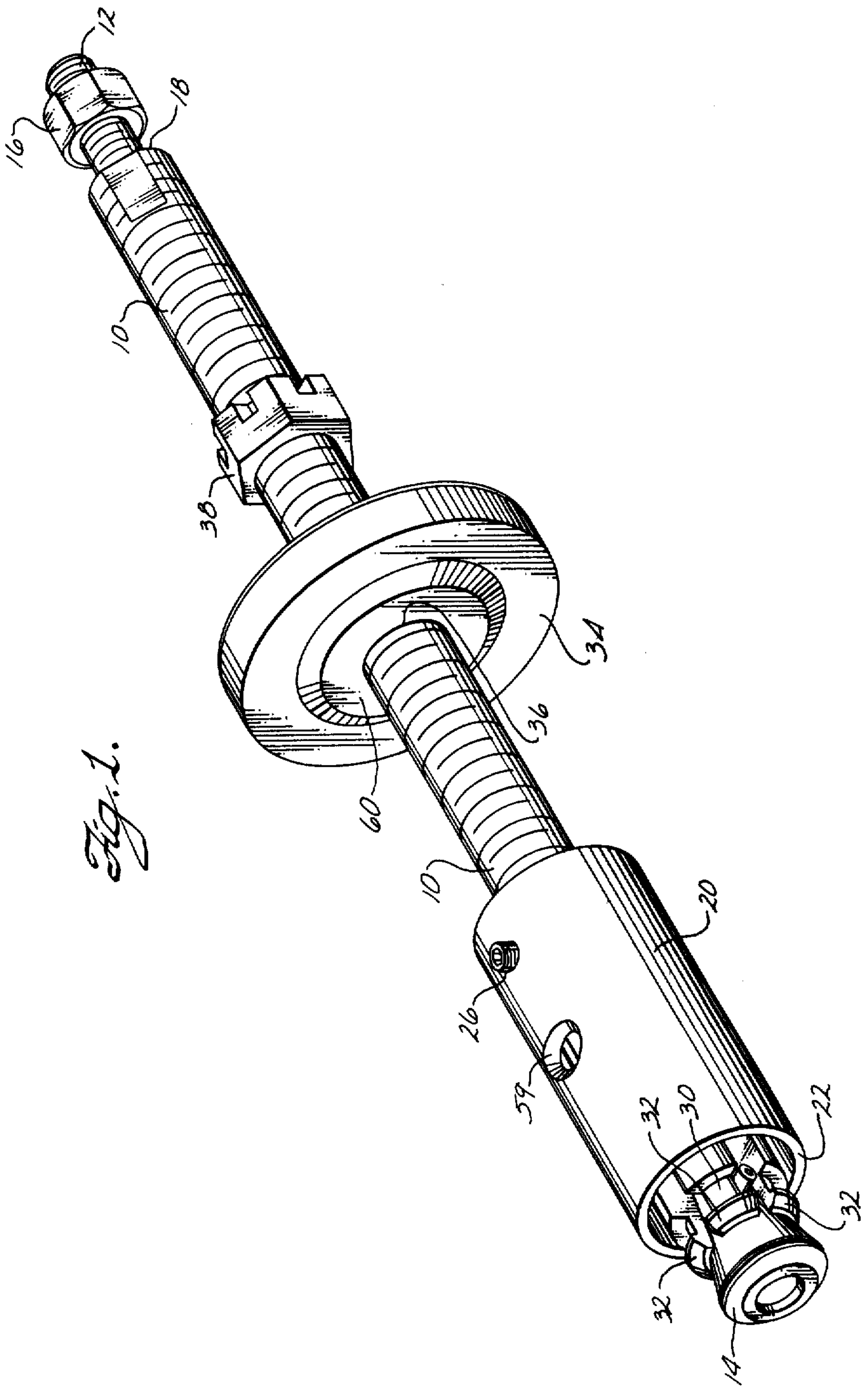
FIG. 1 is a perspective view showing a seal puller according to principles of this invention.

FIG. 1 is a perspective view illustrating a seal puller which includes a hollow, elongated, externally threaded outer shaft 10 and an elongated, externally threaded inner shaft 12 extending axially through the interior of the hollow outer shaft. The outside diameter of the inner shaft closely matches the inside diameter of the hollow outer shaft so that there is minimal lateral movement of the inner shaft inside the interior of the outer shaft. The inner shaft is freely movable axially relative to the outer shaft. The outer shaft and inner shaft are also referred to herein as the support rod and actuating rod, respectively.

One end of the inner shaft carries a tapered jaw spreader 14. The opposite end of the inner shaft carries an actuating nut 16 which is threaded onto the inner shaft adjacent an annular end face 18 at the end of the outer shaft 10. As the actuating nut 16 is tightened against the annular end face 18 of the outer shaft, the inner shaft can be drawn axially outwardly from the interior of the outer shaft for pulling the tapered jaw spreader 14 toward the right in FIG. 1.

A depth guide in the form of a tubular sleeve 20 is carried on the outer shaft 10 adjacent the jaw spreader 14. The depth guide sleeve has an outside diameter that closely matches the inside diameter of the housing from which an annular seal is to be extracted. An annular working face 22 of the depth guide sleeve is adapted to engage an annular face of the seal being removed.

The depth guide sleeve is secured to the outer shaft by a support ring 24 (shown in FIGS. 2, 4 and 5) carried on the outer shaft. The support ring is rigidly affixed to the end of the outer shaft. The support ring can slide axially inside the depth guide. A set screw 26 threaded through a hole 27 in the depth guide sleeve engages one of several adjustment holes 28*a*, 28*b* or 28*c* in the outer surface of the support ring. The set screw holds the depth guide sleeve in a selected fixed position on the support ring.

A plurality of elongated jaws 30 extend axially alongside the jaw spreader 14. In the illustrated embodiment, there are four separate jaws and they are equidistantly spaced apart from one another, i.e., at 90° intervals, circumferentially around the outer surface of the jaw spreader. The jaws are preferably made of steel and are relatively stiff, but they are sufficiently thin that they have a degree of lateral flexibility so they may be spread apart (radially outwardly) from one another by the jaw spreader. The tips of the jaws have radially outwardly protruding flanges 32 for locking onto a face of a seal being removed by the seal puller. The ends of the jaws opposite the flanges 32 are rigidly affixed to an annular face of the support ring 24, as illustrated best in FIG. 4.

A circular pressure plate 34 is slidable lengthwise along the outer shaft 10. The outside diameter of the pressure plate is at least as great or greater than the outside diameter of a housing or sleeve from which the seal is being removed. The outer shaft 10 passes through an axial opening 36 in the pressure plate 34. The opening 36 is slightly oversized with respect to the outside diameter of the outer shaft so that the pressure plate can slide axially along the outer shaft, but with minimal lateral movement relative to the shaft. The pressure plate is movable axially along the outer shaft between the depth guide sleeve 20 and the end of the outer shaft opposite the jaws.

A pressure adjustment 38 is threaded onto the outer shaft 10 between the actuating nut 16 and the pressure plate 34. The nut 38 is adapted to be tightened against the adjacent face of the bearing plate 34 so the bearing plate can apply pressure to the exterior end wall of a housing from which the seal is being removed.

Figure 4:
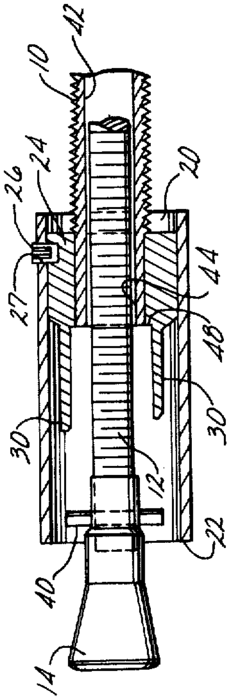
FIG. 4 is a fragmentary side elevation view, partly in cross section, showing a tapered jaw spreader passing through the interior of a sleeve and threaded shaft of the bearing puller.
Figure 5:
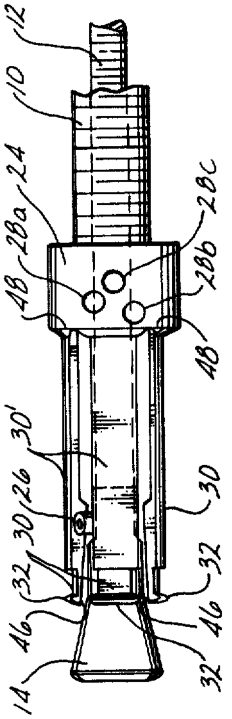
FIG. 5 is a fragmentary side elevation view, partly in cross section, showing the jaws and jaw spreader of the seal puller.

Further details of construction of the seal puller are best understood by referring to FIGS. 4 and 5. FIG. 4 shows the jaws 30 broken away to illustrate assembly of the jaw spreader 14. A key 40 fastens the jaw spreader onto the end of the inner shaft 12. FIG. 4 also shows the inner shaft passing through an axial passage 42 in the outer shaft. The inner shaft also passes through an opening in the support ring 24. The differences in relative size between the inner shaft on the one hand and the passage through the outer shaft on the other hand are exaggerated in FIG. 4 for clarity. In practice, the outside diameter of the inner shaft closely matches the inside diameter of the passage through the outer shaft. The inner shaft is thus able to move freely axially through the outer shaft and the support ring. The inner shaft also would normally be able to rotate about its axis relative to the outer shaft and the support ring, but the key 40 protrudes beyond both sides of the jaw spreader into spaces between the jaws, as shown in FIG. 5. This prevents relative rotation between the inner shaft and the jaw spreader relative to the outer shaft and the jaws carried on the outer shaft.

As shown best in FIG. 5, the jaws extend lengthwise alongside the end portion of the inner shaft. The bottom portions 46 of the jaws, beneath the flanges 32, act as bearing surfaces that can ride on the tapered outer surface of the jaw spreader. In the normal position of the jaws, illustrated in FIG. 5, in which the jaws are in their normal retracted position, the bearing surfaces 46 of the jaws are spaced slightly from the outer surface of the adjacent jaw spreader. The principal portions 30' (see FIG. 5) of the jaws extend alongside the inner shaft and are spaced laterally outwardly from the inner shaft. Thus, in the normal position of the jaws, the jaws normally extend in an axial direction parallel to the adjacent inner shaft and jaw spreader, without substantial contact with the inner shaft or the jaw spreader. The inner ends 48 of the jaws are rigidly affixed to the support ring 24, say by welding. Thus, the outer shaft, the support ring and the jaw spreader are normally free to move axially within the depth guide sleeve 20; and the same unit is also able to rotate about its axis within the passage in the depth guide sleeve 20, as long as the set screw 26 is loosened.

Figure 2:
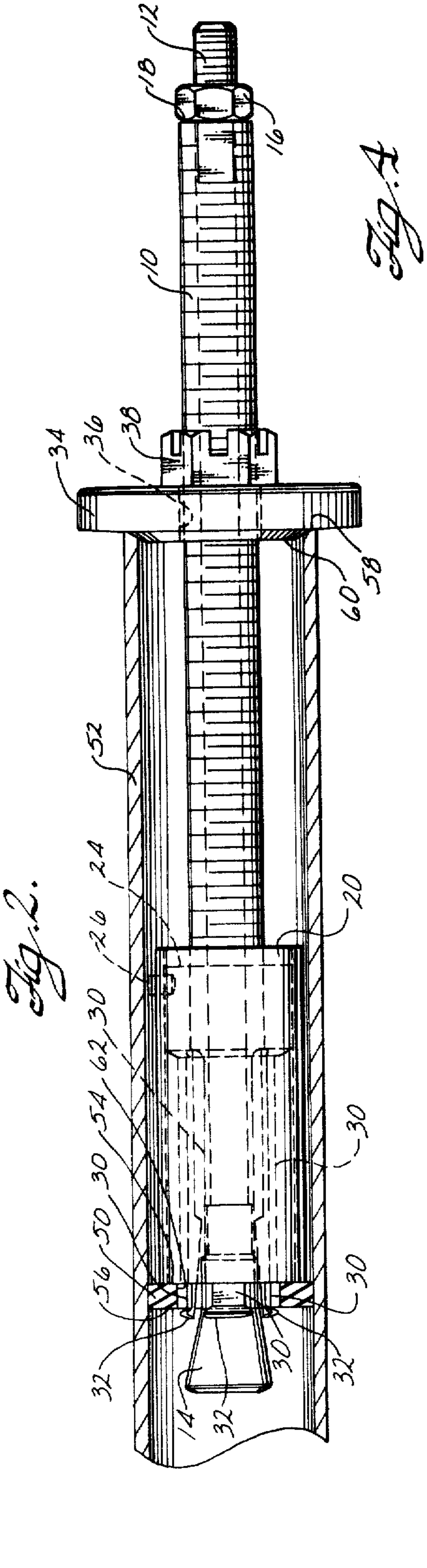
FIG. 2 is a fragmentary side elevation view, partly in cross section, illustrating the seal puller in use prior to extracting a seal from a power steering rack and pinion housing.
Figure 3:
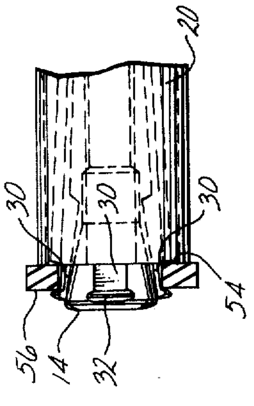
FIG. 3 is a fragmentary side elevation view, partly in cross section, showing the seal puller in a position where the jaws have been spread apart so as to engage the rear face of the seal being extracted.

FIGS. 2 and 3 best illustrate the tool in use for pulling an annular seal 50 from the interior of a tubular housing or sleeve 52. The illustrated housing can be a power steering rack and pinion housing; and the seal can be the inner rack seal, although the tool can also be used to extract other seals from a rack and pinion housing, as well as other seals from other similar types of housings. The seal 50 has an annular front face 54 and an annular rear face 56. The distance between the front and rear faces of the seal, i.e., the seal thickness is critical. Before inserting the tool into the housing, the distance between the flanges 32 of the jaws 30 and the working face 22 of the sleeve 20 is set to match the seal thickness. The seal thickness is known and can be determined by referring to specifications for power steering units of different makes of automobiles. The tool can be easily set to the desired seal thickness. In the illustrated embodiment, the adjustment holes 28*a*, 28*b*, etc. are located for setting the spacing between the sleeve and the flanged tips of the jaws to match the seal thickness. The holes in the support ring are axially spaced apart and each hole corresponds to a different pre-set spacing between the end wall 22 of the sleeve and the flanges of the jaws for matching a different seal thickness. The holes can be indexed for easy reference to corresponding seal thicknesses. A greater number of set screw holes than the three shown in the drawings can also be used. In setting the tool to the desired seal thickness, the depth guide sleeve is moved axially relative to the support ring to align the desired adjustment holes 28*a*, 28*b*, etc. with the set screw hole 27 in the depth guide sleeve. A hole 59 in the sleeve can be used to locate the adjustment holes 28*a*, 28*b*, etc. The set screw 26 is then threaded into the set screw hole 27 and into the desired adjustment hole 28*a*, 28*b*, etc., in the support ring for rigidily affixing the spacing between the flanges of the jaws and the annular face 22 of the sleeve 20.

The seal puller is then inserted into the passage through the housing. The diameter of the sleeve 20 is similar to the diameter of the seal being extracted so that upon inserting the tool into the housing 52 the working face 22 of the sleeve 20 can engage the front face 54 of the seal. This acts as a stop for the tool as it passes axially into the housing. The jaws, in their normal position (shown in FIG. 2) and the jaw spreader 14 pass through the central opening 62 in the seal. Since the tool has been pre-set to match the seal thickness, the flanges of the jaws will extend just beyond the rear face 56 of the seal when the sleeve is stopped by contact with the front face of the seal. The outer diameter of the sleeve 20 just matches the inside diameter of the housing so that the tool can slide axially through the housing, with the inner and outer shafts being reasonably aligned with the axis of the housing (and consequently the seal).

Once the sleeve has contacted the front face of the seal, the pressure plate 34 is slidably moved along the outer shaft and placed against the annular end face 58 of the housing. The pressure plate preferably has a circular centrally located raised region 60 that matches the diameter of the housing so that the pressure plate can be centered on the end of the housing. The nut 38 is then tightened against the rear face of the pressure plate 34 just sufficiently to hold the tool in place in the housing, without applying pressure axially that would otherwise draw the outer shaft out of the housing.

The jaw spreader is then actuated to expand the jaws so as to tighten against the rear face of the seal. The jaw spreader is actuated by tightening the actuating nut 16 against the annular face 18 at the end of the outer shaft. By tightening the nut 16 against the end face of the outer shaft, the inner shaft 12 shortened and thereby is drawn axially out of the housing. This causes the tapered outer surface of the jaw spreader to move toward the flexible jaws 30, i.e., in a direction toward the right in FIG. 2. Continued tightening of the nut 16 causes continued axial travel of the jaw spreader in a direction toward the jaws, causing the bearing surfaces 46 of the jaws to ride upwardly and outwardly on the wider tapering outer surface of the jaw spreader. This causes the flexible jaws to move radially outwardly away from the axis of the tool until the flanges 32 of the jaws are expanded a sufficient distance radially that they exceed the diameter of the circular opening 62 in the seal. That is, the flanges are expanded by a distance sufficient to allow the flanges to engage the rear face of the seal. At this point, the seal can be drawn out of the housing.

The pressure adjustment nut 38 is then tightened against the pressure plate 34. This draws the outer shaft 10 axially out of the housing, to the right in FIG. 2. This, in turn, draws the jaws 30 axially through the housing in the same direction, exerting an axial pull on the seal. The flanges of the jaws are of sufficient width that they make good contact with the seal entirely around the annular rear face of the seal. This effectively transfers the pressure from the tightened pressure plate to the rear face of the seal, so as to remove the seal from its seated position in the housing. The seal remains clamped between the flanges of the jaws and the working face 22 of the sleeve 20 until the seal is pulled axially from its seated position in the housing, after which the seal and the tool may be easily pulled from the housing.

The tool is adapted to easily remove seals of varying thicknesses and diameters. As an alternative embodiment, the set screw indexing holes in the support ring can be replaced by a threaded connection between the support ring and the inside surface of the sleeve. In this instance, the depth guide sleeve can be rotated relative to the support ring to move the sleeve axially to the desired spacing between the end of the sleeve and the flanged tips of the jaws. Information can be provided on the number of turns of the sleeve required to set the tool to match each required seal thickness.

What is claimed is:

1. A seal puller for pulling an annular seal from the interior of a cylindrical housing, the seal having annular front and rear faces and a central opening, and wherein the seal is seated internally within the housing spaced from an exterior end wall of the housing, the seal puller comprising:

a plurality of elongated, flexible jaws having radially protruding portions for locking against the rear face of the seal;

an elongated support member supporting the jaws in a normally retracted position in which the jaws and their protruding portions can pass through the central opening in the seal as the support member extends into the housing;

depth guide means carried on the support member adjacent the jaws, the depth guide means having an end wall for engaging the front face of the seal;

means for adjusting the spacing between the protruding portions of the jaws and the end wall of the depth guide means to match the distance between the front and rear faces of the seal;

means for moving the jaws from their retracted position to an expanded position in which the protruding portions of the jaws engage the rear face of the seal;

a pressure plate carried on the support member and spaced from the depth guide means on a side thereof opposite the protruding portions of the jaws, the pressure plate having a bearing surface for engaging the exterior end wall of the housing; and means for tightening the bearing surface of the pressure plate against the exterior end wall of the housing to shorten the length of the support member in the housing for causing the protruding portions of the jaws to apply apply pressure to the rear face of the seal for pulling the seal from the housing.

2. Apparatus according to claim 1 in which the means for expanding the jaws comprises a tapered jaw spreader; an elongated actuating rod supporting the jaw spreader adjacent the jaws, the actuating rod extending through the support rod; and means for moving the actuating rod axially relative to the support rod for moving the tapered jaw spreader toward the jaws for causing the jaws to engage the tapered jaw spreader and flex the jaws radially outwardly to an expanded position.

3. Apparatus according to claim 2 in which the actuating rod has an end opposite the jaw spreader which protrudes outwardly from an adjacent end of the support member; and including an adjustment nut on the actuating rod for being tightened against the adjacent end of the support member for shortening the effective length of the actuating rod relative to the support member to engage the tapered jaw spreader with the jaws for expanding the jaws.

4. Apparatus according to claim 3 in which the pressure plate is carried loosely on the support member; and in which the means for tightening the pressure plate against the housing comprises a pressure adjustment nut threaded onto a corresponding threaded portion of the support member on a side of the pressure plate opposite the depth guide means.

5. Apparatus according to claim 1 in which the pressure plate is carried loosely on the support member; and in which the means for tightening the pressure plate against the housing comprises a pressure adjustment nut threaded onto a corresponding threaded portion of the support member on a side of the pressure plate opposite the depth guide means.

6. Apparatus according to claim 1 in which the depth guide means includes a cylindrical sleeve with an annular end wall for engaging the front face of the seal, and in which the jaws are supported within the sleeve and protrude outwardly from the annular end wall of the sleeve.

7. Apparatus according to claim 6 including a support ring rigidly affixed to the support member; and in which the sleeve is mounted on the support ring, and in which the jaws are supported on the support ring.

8. Apparatus according to claim 7 in which the sleeve is adjustable with respect to its position on the support ring for adjusting the spacing between the protruding portions of the jaws and the end wall of the sleeve.

9. A seal puller for pulling an annular seal from the interior of a cylindrical housing, the seal having annular front and rear faces and a central opening, and wherein the seal is seated internally within the housing spaced from an exterior end wall of the housing, the seal puller comprising:

a hollow elongated externally threaded support rod;

an elongated externally threaded adjustment rod passing through the hollow interior of the support rod;

a tapered jaw spreader carried on an end of the actuating rod;

a support ring rigidly affixed to the support rod;

a plurality of elongated flexible jaws affixed to the support ring and extending alongside the tapered jaw spreader, the flexible jaws having flanged tips;

a depth guide sleeve carried on the support ring and having an annular end wall spaced from the tips of the jaws;

means for adjusting the position of the sleeve on the support ring to preset the spacing between the end wall of the sleeve and the tips of the jaws to match the seal thickness;

a pressure plate carried on the support rod on a side of the sleeve opposite the flanged tips of the jaws;

a pressure applying nut threaded onto an end portion of the actuating rod protruding from an end of the support rod opposite the jaws for being tightened against the end of the support rod to draw the tapered jaw spreader toward the jaws for expanding the jaws; and means for tightening the pressure plate against the end wall of the housing to draw the support rod out of the housing toward the bearing plate.

10. Apparatus according to claim 9 in which the pressure plate is carried loosely on the support member, and in which the means for tightening the pressure plate comprises a pressure adjustment nut threaded onto the support rod on a side of the pressure plate opposite the depth guide sleeve.

* * * * *